United States Patent [19]

Korty

[11] Patent Number: 5,021,946
[45] Date of Patent: Jun. 4, 1991

[54] MOSTLY CONTIGUOUS FILE ALLOCATION TECHNIQUE INVOLVING FILE EXTENSION

[75] Inventor: Joseph A. Korty, Coral Springs, Fla.

[73] Assignee: Modular Computer Systems, Inc., Fort Lauderdale, Fla.

[21] Appl. No.: 571,035

[22] Filed: Aug. 22, 1990

Related U.S. Application Data

[63] Continuation of Ser. No. 207,875, Jun. 17, 1988, abandoned.

[51] Int. Cl.⁵ .................. G06F 13/00; G06F 12/02
[52] U.S. Cl. ................... 364/200; 364/246.5; 364/248.1
[58] Field of Search .................. 364/200 MS File

[56] References Cited

U.S. PATENT DOCUMENTS

| | | | |
|---|---|---|---|
| 4,536,837 | 8/1985 | Olson et al. | 364/200 |
| 4,849,878 | 7/1989 | Roy | 364/200 |
| 4,945,475 | 7/1990 | Bruffey et al. | 364/200 |

Primary Examiner—Lawrence E. Anderson
Attorney, Agent, or Firm—Spencer & Frank

[57] ABSTRACT

A method for selecting the sizes and the ordering of the extents used to construct a file, a segment, or a virtual space of a computer system (file). The general method is defined to be any function, applied to this purpose, that, in general, attaches larger extents to the larger file addresses, and for which the selection of extent sizes is determined only by the address an extent is to reside at in the file, plus any tuning parameters. The method results in files which are mostly contiguous, and that stay mostly contiguous, irrespective of any growth or shrinkage the file may be subjected to during its lifetime. High contiguity improves performance by permitting a compact file representation, and, for disc files, improves performance by permitting larger blocks of data to be moved to or from the disc device, and by minimizing head seeks. The repeat factor, along with the doubling of extent size each time the repeat factor expires, is an important innovation that greatly reduces the internal and external fragmentation normally associated with extent based systems.

18 Claims, 1 Drawing Sheet

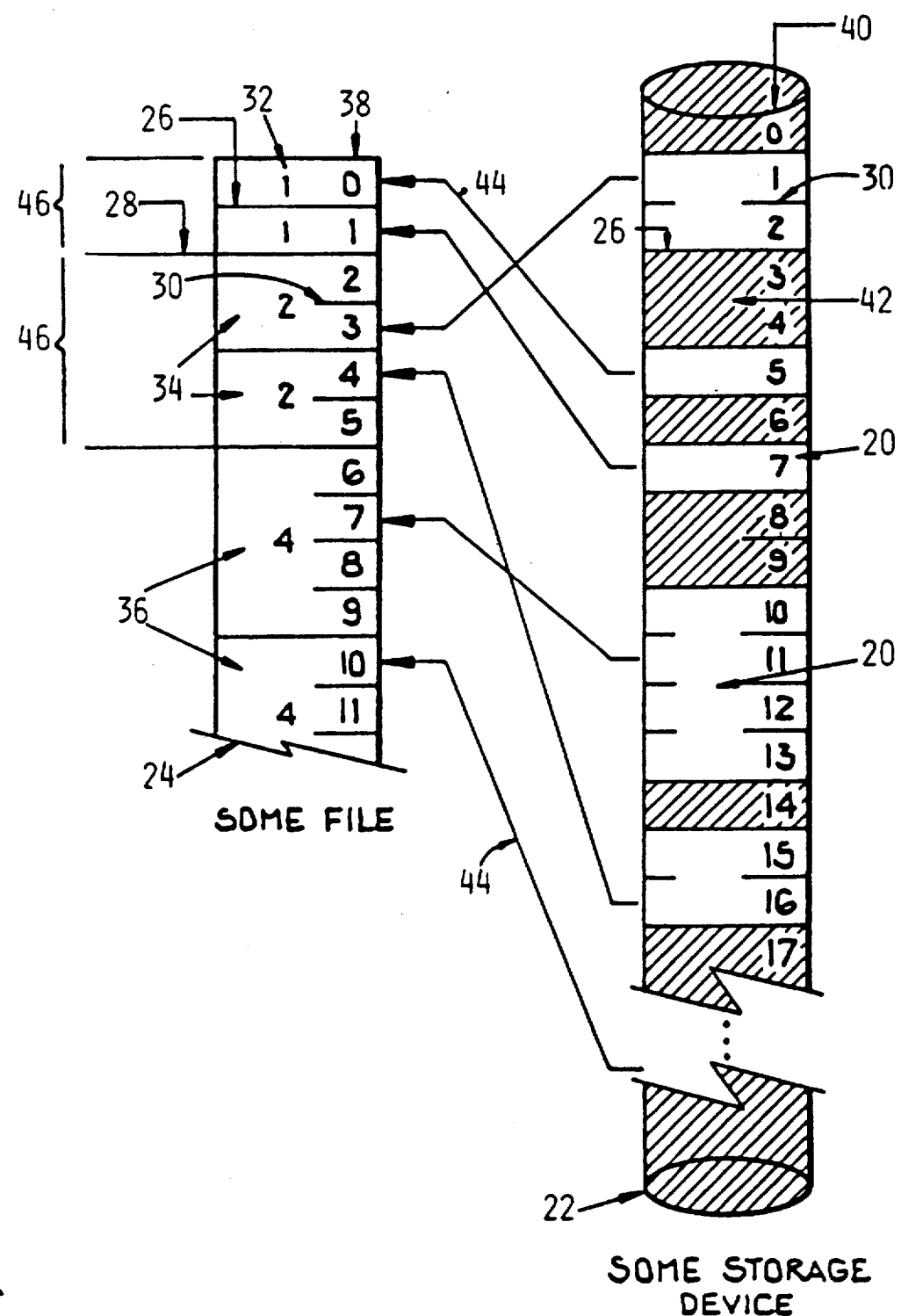

MOSTLY CONTIGUOUS FILE ALLOCATION TECHNIQUE INVOLVING FILE EXTENSION

This application is a continuation, of application Ser. No. 07/207,875, filed June 17th, 1988, now abandoned.

BACKGROUND OF THE INVENTION

A file system is that component of the operating system of a computer that breaks up the available storage area of some device (disk) into an arbitrary number of files, each of which appears, to its users, as if it were a contiguous storage device in its own right. However, such contiguity within a file is usually an illusion. Files are usually build up out of a series of smaller contiguous regions, called extents. To implement an illusion of contiguity, the file system maps any address given to it with respect to a file (file address) into the appropriate physical address on the disk where that part of the file actually resides.

Current art provides a wide variety of such mapping functions, also called file representation methods, most of which fall into two categories. The first, called extent list file representation, maintains a simple array, or a chain of such arrays, for each file. Each array element identifies the location and size of some extent on the disk. The range of file addresses that map to this extent is offset from the start of the file by the sizes of all the extents that are listed before it in the extent list. For example, consider a file having three extents: the first extent being one block long. Also assume the second four blocks long, and the last two blocks long, that a block is some atomic unit of disk storage space, say, 1000 bytes, and that file address 0 points to the first byte of the file. Then file addresses 0-999 map to the disk locations pointed to by the first extent of the file, file addresses 1000-4999 map to the disk locations pointed to by the second extent of the file, and file addresses 5000-6999 map to the disk locations pointed to by the third extent of the file.

The extent tree file representation, the second category of file representation methods, typically uses only a single extent size, say, one block. The enormous number of extents that results for large files is then managed by arranging them into some form of a tree structure. For example, in the popular UNIX(tm) operating system, a 13 element array is used as the root structure. The first ten elements of the array point to the first ten blocks of the file. The eleventh element points to a block which in turn contains pointers to the next 256 blocks in the file. The eleventh element is called, in UNIX terminology, a single level indirection pointer.

The twelfth element of the root array provides second level indirection. It points to a block, which in turn has pointers to 256 other blocks, each of which has pointers to a set of 256 data blocks of the file. Thus second level indirection maps up to $256^2 = 65536$ data blocks into the file. This idea extends to the thirteenth root array element, which provides third level indirection, or access to an additional $256^3$ blocks, which is more than what can be supplied by today's disk technology.

A number of serious performance problems are known to occur with the extent tree file representation method. Random access into a medium or large scale file results in multiple I/O operations for each data block referenced, one for each pointer block that must be accessed to get at a data block. Another performance problem occurs when the potentially very low contiguity that is possible in such files is approached in practice. The extra head seeks necessary to sequentially access highly discontiguous files has been shown to slow down data transfers to and from a file up to a factor of six. In addition, opportunities to do multiblock transfers, thus also minimizing rotational latency as a performance degradation factor, occur less often with the extent tree file representation method. In fact, such contiguities are undependable to the point that no extent tree based implementation known to the applicant has taken advantage of them when they do occur.

The extent list file representation method has a different set of problems. All of them center on the fact that there has been no really effective way to select the sizes of the extents which are to go into a file. Typically, when a file is created, it is not obvious (to the file system at least) how much data will be written to it before it is closed. If the file system chooses a large size for the extents to be appended to the file, and only a little information is written out to the file, then a large amount of unused space is attached to the file which could be better used elsewhere (internal fragmentation). If, on the other hand, a small extent size is chosen and a large amount of data is written out, then the file is potentially highly discontiguous, and the resulting large number of extents will not even have the efficiencies of a tree structure to keep them organized. For those files which are created manually and whose final size is approximately known one method to minimize the tradeoff is to provide an initial size and an extent increment size parameter to the user at the time those files are created.

For automatically created files, and for user created files whose final size can not easily be guessed, the typical system will default the initial size to zero and selects a large extent increment size, usually one track, and simply accepts the high internal fragmentation that results as simply unavoidable. A variation on the above method, such as freeing up the excess space in a file when it is closed, promotes the creation of small, relatively unusuable extents on the disk (external fragmentation), whose magnitude is approximately equal to the internal fragmentation it replaces. When the external fragmentation is in turn minimized by permitting the (manual or automatically made) extent requests to be automatically broken up into a series of smaller extents as required, then the contiguity within a file becomes unpredictable, and often approaches the worst case, namely one block per extent.

SUMMARY OF THE INVENTION

The present invention is directed to an improvement of the extent list file representation method, and seeks to provide a high and easily predictable contiguity for all files, without recourse to user tuning of each file, without regard to the file size, and without regard to any size change a file may be subjected to during its lifetime. In addition, the method avoids the high fragmentation contiguity traditionally triggers in extent list based systems.

In accordance with the invention a method for selecting the size and ordering of the extents of a file is provided wherein the size of an extent starting at a certain file address is a nondecreasing function of said file address and wherein all extents of the same size are adjacent to each other.

BRIEF DESCRIPTION OF THE DRAWING

FIG. 1 shows extents from some disk device being used to construct a file according to the invention.

DETAILED DESCRIPTION OF THE PREFERRED EMBODIMENT

FIG. 1 illustrates an embodiment of the function used to select the sizes and the order of the extents (20) of some disk device (22), or other storage area, as they are to appear in some file (24). The boundaries of the extents are marked by long, horizontal lines 26 and 28; the short tic marcs (30) mark off the block boundaries within an extent. Extents 32 are one block in size, extents 34 are two blocks in size, and extents 36 are four blocks in size. For purposes of illustration, block addresses 38 with respect to file 24 and block addresses 40 with respect to the storage device (22), are also given. The unused portions 42 of the disk device (22) are shaded, in order to easily distinguish them from the used portions. The arrows (44) show the mapping of the extents into the address space of file 24 by the underlying file representational method.

Whereas the present invention is directed to the method of selecting and ordering the sizes of the extents of files, it is compatible with every file representation method that implements the illusion of contiguity, be it extent trees, extent list, or some other as yet unknown representation. According to the invention, for small files, small extents must be appended if internal fragmentation is to be kept down, but for larger files, larger extents may be appended without adversly effecting the internal fragmentation.

All embodiments of the invention group the extents of a file into levels (46), where a level is defined to be all adjacent extents of the same size. The boundaries between levels is visually reinforced in FIG. 1 by horizontal lines (28) longer than the lines 26 that mark normal extent boundaries.

The number of extents that appear within a level is called that level's repeat factor. In the preferred embodiment, the repeat factor is the same for all levels In the figure the repeat factor is two; however repeat factors of four or five are in practice much more effective in reducing the internal and external fragmentation of the method, while maintaining high contiguity.

The method requires that extents residing in levels at higher file addresses be larger than the extents in levels occupying lower file addresses (for example, extents 36 have higher file addresses than extents 34 and thus are larger in size). In the preferred embodiment, the extents in adjacent levels differ in size by a factor of two. This rapid growth in extent size means that the number of extents in a file is roughly proportional to the logarithm of the file's current size, that is, it remains mostly contiguous. The application of a repeat factor is a key development that mitigates the effects this rapid growth would otherwise have on the internal and external fragmentation of the file system.

Although this invention has been described almost exclusively in terms of disk files, it can be applied productively to a variety of other memory management problems. For example, the method could provide an especially effective and compact way of implementing varying-length segments in the hardware of a computer with a segmented architecture. For computers which do not implement segments, but instead support in hardware a virtual space concept for each executing process, a part of the virtual space mechanism could in many cases be efficiently implemented by this method.

What is claimed is:

1. A file extension method for data processing files for selecting the sizes and ordering of the extents of a file, each extent including at least one block, wherein the size of an extent starting at a certain file address is an increasing function only of said file address and wherein all extents of the same size are adjacent to each other in the file, the extents being stored at arbitrary locations in a storage device, whereby files are kept contiguous or nearly contiguous as each extent has at least as many blocks as the extent immediately preceeding it.

2. A method as described in claim 1, wherein for each pair of adjacent extents in the file with different sizes, the size of the larger extent is selected to be double the size of the smaller extent.

3. A method as described in claim 1, wherein for each pair of adjacent extents in the file with different sizes, the size of the larger extent is selected to be a constant multiple of the size of the smaller extent.

4. A method as described in claim 1, wherein for each pair of adjacent extents in the file with different sizes, the size of the larger extent is selected to be larger than the size of the smaller extent by a constant amount.

5. A method as described in claim 1, wherein for a sequence of unique extent sizes selected by said method, said sizes are based on a Fibonacci sequence of numbers.

6. A method as described in claim 1, wherein the number of adjacent extents in the file which are selected to have the same size is a constant greater than or equal to two.

7. A method as described in claim 1, wherein the number of adjacent extents in the file which are selected to have the same size, said number being called the repeat factor, is a nondecreasing function of the file address.

8. A method as described in claim 7, wherein the series of said repeat factors internally used by said function form an ascending sequence, such that any two adjacent repeat factors differ by a constant amount.

9. A method as described in claim 7, wherein the series of said repeat factors internally used by said function form an ascending sequence, such that the ratio of any two adjacent repeat factors is a constant greater than 1.0.

10. A method as described in claim 7, wherein the series of repeat factors internally used by said function form an ascending sequence based on a Fibanacci sequence of numbers.

11. A method as described in claim 7, wherein the series of said repeat factors internally used by said function has a finite number of members, and wherein the final member, in order to accomodate arbitrarily large files, is arbitrarily large.

12. A method for storing an extendable data processing file having a series of blocks, comprising:
  (a) forming the file from a sequence of extents, the first extent of the sequence including the first block of the file and each subsequent extent of the sequence containing at least as many block as the extent immediately preceding said subsequent extent, the number of blocks in the beginning extents being less than in subsequent extents, with at least one extent of the sequence containing more blocks than the extent immediately preceding said at least one extent; and (b) storing the extents at arbitrary locations in a storage device, whereby the files are kept contiguous or mostly contiguous.

13. The method of claim 12, wherein step (a) comprises assigning the first block of the file to the first extent of the sequence, assigning the second block of the file to the second extent of the sequence, and assigning the third block of the file to the third extent of the sequence.

14. The method of claim 12, wherein step (a) is conducted so that, for each pair of adjacent extents in the sequence, the extents of the pair either contain the same number of blocks or the larger extent of the pair is larger by a constant amount.

15. The method of claim 13, wherein step (a) further comprises assigning the fourth block of the file to the third extent of the sequence, assigning the fifth and sixth blocks of the file to the fourth extent of the sequence, and assigning the seventh block of the file to the fifth extent of the sequence.

16. The method of claim 15, wherein step (a) further comprises assigning the eighth, ninth, and tenth blocks of the file to the fifth extent.

17. The method of claim 12, wherein step (a) is conducted so that, for each pair of adjacent extents in the sequence, the extents of the pair either contain the same number of blocks or the larger extent of the pair contains an integer multiple of the number of blocks in the smaller extent of the pair.

18. The method of claim 17, wherein the integer is two.

* * * * *